(12) United States Patent
Komura

(10) Patent No.: US 11,462,365 B2
(45) Date of Patent: Oct. 4, 2022

(54) POSITIVE ELECTRODE FOR LITHIUM ION CAPACITOR AND LITHIUM ION CAPACITOR USING THE POSITIVE ELECTRODE, AND PRODUCTION METHODS THEREOF

(71) Applicant: TOYOTA JIDOSHA KABUSHIKI KAISHA, Toyota (JP)

(72) Inventor: Shingo Komura, Nagakute (JP)

(73) Assignee: TOYOTA JIDOSHA KABUSHIKT KAISHA, Toyota (JP)

( * ) Notice: Subject to any disclaimer, the term of this patent is extended or adjusted under 35 U.S.C. 154(b) by 96 days.

(21) Appl. No.: 16/519,100

(22) Filed: Jul. 23, 2019

(65) Prior Publication Data
US 2020/0051754 A1     Feb. 13, 2020

(30) Foreign Application Priority Data
Aug. 8, 2018   (JP)  .............................. JP2018-149684

(51) Int. Cl.
| | |
|---|---|
| *H01M 4/00* | (2006.01) |
| *H01G 11/34* | (2013.01) |
| *H01G 11/06* | (2013.01) |
| *H01G 11/50* | (2013.01) |
| *H01M 4/36* | (2006.01) |
| *H01G 11/62* | (2013.01) |
| *H01M 10/44* | (2006.01) |

(Continued)

(52) U.S. Cl.
CPC ............. *H01G 11/34* (2013.01); *H01G 11/06* (2013.01); *H01G 11/50* (2013.01); *H01G 11/52* (2013.01); *H01G 11/62* (2013.01); *H01M 4/133* (2013.01); *H01M 4/364* (2013.01); *H01M 10/44* (2013.01)

(58) Field of Classification Search
CPC ........ H01G 11/38; H01G 11/34; H01G 11/62; H01G 11/14; H01M 4/382; H01M 4/0471
See application file for complete search history.

(56) References Cited

U.S. PATENT DOCUMENTS

| | | | |
|---|---|---|---|
| 2017/0011860 A1 | 1/2017 | Okuno et al. | |
| 2017/0194106 A1 | 7/2017 | Majima et al. | |
| 2018/0048040 A1* | 2/2018 | Liu | ......... H01G 11/66 |

(Continued)

FOREIGN PATENT DOCUMENTS

| | | |
|---|---|---|
| JP | 2006-324284 A | 11/2006 |
| JP | 2010-245086 A | 10/2010 |

(Continued)

*Primary Examiner* — Cynthia H Kelly
*Assistant Examiner* — Monique M Wills
(74) *Attorney, Agent, or Firm* — Sughrue Mion, PLLC (57) ABSTRACT

Provided is a positive electrode for lithium ion capacitor that allows increasing the capacity of a lithium ion capacitor. A method for producing a positive electrode for lithium ion capacitor disclosed herein includes a the steps of: giving a positive electrode mixture containing an activated carbon, a binder and a solvent, to a positive electrode collector; drying the positive electrode collector having the positive electrode mixture given thereto, to form a positive electrode mixture layer; and thermally treating the formed positive electrode mixture layer in an inert gas atmosphere or under reduced pressure, so that oxygen-containing functional groups present on the surface of the activated carbon detach from the surface of the activated carbon.

7 Claims, 3 Drawing Sheets

(51) Int. Cl.
    *H01M 4/133*     (2010.01)
    *H01G 11/52*     (2013.01)

(56) References Cited

U.S. PATENT DOCUMENTS

2018/0090282 A1*   3/2018   Matsuo .................. H01G 11/56
2018/0301290 A1   10/2018   Ogihara

FOREIGN PATENT DOCUMENTS

| | | |
|---|---|---|
| JP | 2015-154003 A | 8/2015 |
| JP | 2015-154039 A | 8/2015 |
| JP | 2017-022186 A | 1/2017 |
| JP | 2017-152416 A | 8/2017 |

* cited by examiner

FIG.3

POSITIVE ELECTRODE FOR LITHIUM ION CAPACITOR AND LITHIUM ION CAPACITOR USING THE POSITIVE ELECTRODE, AND PRODUCTION METHODS THEREOF

BACKGROUND OF THE INVENTION

1. Field of the Invention

The present teaching relates to a positive electrode for lithium ion capacitor. The present teaching relates also to a lithium ion capacitor that utilizes the positive electrode. The present teaching further relates to methods for producing the foregoing. The present application claims priority based on Japanese Patent Application No. 2018-149684 filed on Aug. 8, 2018, the entire contents of which are incorporated in the present specification by reference.

2. Description of the Related Art

By virtue of the excellent output characteristics of lithium ion capacitors, these are expected to find application in power sources for vehicle drive for instance in electric vehicles (EVs), hybrid vehicles (HVs) and plug-in hybrid vehicles (PHVs).

Positive electrodes in typical lithium ion capacitors are provided with a positive electrode mixture layer that contains an activated carbon as a positive electrode active material, and a binder (see for instance Japanese Patent Application Publication No. 2015-154003 and Japanese Patent Application Publication No. 2015-154039). For the purpose of enhancing cycle characteristics, Japanese Patent Application Publication No. 2015-154039 proposes the use, as the positive electrode active material of a lithium ion capacitor, of an activated carbon in which a carboxyl group amount has been lowered through a thermal treatment in a reducing atmosphere.

SUMMARY OF THE INVENTION

Diligent research conducted by the inventors has revealed, however, that conventional technologies still have room for improvement as regards increasing the capacity of lithium ion capacitors.

It is thus an object of the present teaching to provide a positive electrode for lithium ion capacitor that allows increasing the capacity of a lithium ion capacitor.

A method for producing a positive electrode for lithium ion capacitor disclosed herein includes the steps of: giving a positive electrode mixture containing an activated carbon, a binder and a solvent, to a positive electrode collector; drying the positive electrode collector having the positive electrode mixture given thereto, to form a positive electrode mixture layer; and thermally treating the formed positive electrode mixture layer in an inert gas atmosphere or under reduced pressure, so that oxygen-containing functional groups present on the surface of the activated carbon detach from the surface of the activated carbon.

Such a configuration can produce a positive electrode for lithium ion capacitor that allows increasing the capacity of a lithium ion capacitor.

A method for producing a lithium ion capacitor disclosed herein includes the steps of: obtaining a positive electrode for lithium ion capacitor in accordance with the above method for producing a positive electrode for lithium ion capacitor; producing an electrode body in a dry atmosphere, using a negative electrode, a separator and the obtained positive electrode for lithium ion capacitor; and producing a lithium ion capacitor in a dry atmosphere, using an electrolyte solution and the produced electrode body. In the step of obtaining the positive electrode for lithium ion capacitor, the obtained positive electrode for lithium ion capacitor is placed in a dry atmosphere.

Such a configuration allows producing a high-capacity lithium ion capacitor.

The positive electrode for lithium ion capacitor disclosed herein includes a positive electrode mixture layer, wherein the positive electrode mixture layer contains at least an activated carbon and a binder. The positive electrode mixture layer is thermally treated in an inert gas atmosphere or under reduced pressure, so that oxygen-containing functional groups present on the surface of the activated carbon detach from the surface of the activated carbon.

Such a configuration can provide a positive electrode for lithium ion capacitor that allows increasing the capacity of a lithium ion capacitor.

The positive electrode for lithium ion capacitor disclosed herein includes a positive electrode mixture layer, wherein the positive electrode mixture layer contains at least an activated carbon and a binder, when a single-electrode cell is constructed using the positive electrode, metallic lithium as a counter electrode, and an using an electrolyte solution in the form of a solution resulting from dissolving $LiPF_6$ to a concentration of 1.0 mol/L in a mixed solvent that contains ethylene carbonate, dimethyl carbonate and ethyl methyl carbonate at a volume ratio of 1:1:1, the potential at an inflection point of a dQ/dV-potential profile calculated on the basis of a CC-CV charge curve at a rate of 1/20 C is 3.05 V or higher.

Such a configuration can provide a positive electrode for lithium ion capacitor that allows increasing the capacity of a lithium ion capacitor.

In a desired mode of the positive electrode for lithium ion capacitor disclosed herein, the potential at the inflection point is 3.20 V or higher.

Such a configuration allows further increasing the capacity of a lithium ion capacitor.

The lithium ion capacitor disclosed herein is provided with the above positive electrode for lithium ion capacitor.

Such a configuration allows providing a high-capacity lithium ion capacitor.

DESCRIPTION OF THE PREFERRED EMBODIMENTS

Embodiments of the present teaching will be explained below with reference to accompanying drawings. Any features other than the matter specifically set forth in the present specification and that may be necessary for carrying out the present teaching (for instance, general configurations and production processes of lithium ion capacitors, and not being characterizing features of the present teaching) can be regarded as instances of design matter for a person skilled in the art based on known techniques in the relevant technical field. The present teaching can be realized on the basis of the disclosure of the present specification and common technical knowledge in the relevant technical field. In the drawings below, members and portions eliciting identical effects are denoted by identical reference symbols. The dimensional relationships (length, width, thickness and so forth) in the figures do not reflect actual dimensional relationships.

The method for producing a positive electrode for lithium ion capacitor according to the present embodiment includes a step (hereafter referred to as "giving step") of giving a positive electrode mixture containing an activated carbon, a binder and a solvent, to a positive electrode collector; a step (hereafter referred to as "drying step") of drying the positive electrode collector having the positive electrode mixture given thereto, to form a positive electrode mixture layer; and a step (hereafter referred to as "thermal treatment step") of thermally treating the formed positive electrode mixture layer in an inert gas atmosphere or under reduced pressure, so that oxygen-containing functional groups present on the surface of the activated carbon detach from the surface of the activated carbon.

The giving step will be explained first.

The positive electrode mixture used in the giving step contains an activated carbon, a binder and a solvent. The positive electrode mixture may further contain, as needed, for instance a conductive aid.

Typically, an activated carbon resulting from a carbonization treatment and an activation treatment of the starting materials exemplified below can be used as the activated carbon; herein there can be used known activated carbons that are utilized as a positive electrode active material in lithium ion capacitors.

Examples of starting materials of the activated carbon include for instance plant-based materials such as wood, wood flour, coconut shells and pulp waste liquor; fossil-based materials such as coal-based pitch, petroleum-based pitch, coke and coal tar; and synthetic resins such as phenolic resins.

The method in the carbonization treatment may involve for instance firing the above starting materials in an inert gas atmosphere.

The method of the activation treatment may be for instance a gas activation method such as steam activation, or a chemical activation method such as alkali activation.

The average particle size of the activated carbon is not particularly limited, but is desirably 20 m or less, more desirably not less than 1 μm but not more than 15 μm, and yet more desirably not less than 1 pun but not more than 8 μm. In the present specification, the term average particle size denotes a 50% volume cumulative diameter D50 determined from a particle size distribution measured in accordance with a laser diffraction method.

The specific surface area of the activated carbon is not particularly limited, but is desirably not less than 800 m$^2$/g but not more than 3000 m$^2$/g, and more desirably not less than 1500 m$^2$/g but not more than 2800 m$^2$/g. The specific surface area of the activated carbon can be determined for instance in accordance with the BET method.

A polymer binder not having a redox decomposition zone at the charge and discharge potential can be suitably used as the binder. Concrete examples of the binder include fluororesins such as polyvinylidene fluoride (PVdF) and polytetrafluoroethylene (PTFE); cellulose derivatives such as carboxymethyl cellulose (CMC); rubbery polymers such as styrene butadiene rubber (SBR); acrylic binders; polyvinyl alcohol (PVA); and polyethylene oxide.

For instance, water such as ion-exchanged water, an organic solvent such as N-methyl pyrrolidone (NMP) or the like can be used as the solvent.

As the conductive aid, there can be used for instance carbon black such as acetylene black or Ketjen black; or graphite.

The content of the activated carbon in the total solids of the positive electrode mixture is not particularly limited, but is desirably 70 mass % or higher, more desirably not lower than 75 mass % but not higher than 98 mass %, and yet more desirably not lower than 80 mass % but not higher than 96 mass %.

The content of binder in the total solids of the positive electrode mixture is not particularly limited, but is desirably not lower than 0.5 mass % but not higher than 15 mass %, more desirably not lower than 1 mass % but not higher than 12 mass % and yet more desirably not lower than 2 mass % but not higher than 10 mass %.

The content of conductive aid in the total solids of the positive electrode mixture is not particularly limited, but is desirably not lower than 0.5 mass % but not higher than 15 mass %, more desirably not lower than 1 mass % but not higher than 12 mass %, and yet more desirably not lower than 2 mass % but not higher than 10 mass %.

The positive electrode mixture may be in the form of a paste or a slurry. In a case where the positive electrode mixture is in the form of a paste or a slurry, the solids concentration of the positive electrode mixture is desirably not lower than 10 mass % but not higher than 60 mass %, more desirably not lower than 12 mass % but not higher than 50 mass % and yet more desirably not lower than 14 mass % but not higher than 40 mass %.

The positive electrode mixture can be produced in accordance with a known method. For instance, the positive electrode mixture can be produced by mixing the components that make up the positive electrode mixture using a known mixing apparatus, kneading apparatus or stirring apparatus.

The material of the positive electrode collector used in the giving step is not particularly limited, so long as for instance reactions and leaching are not prone to occur at the charge and discharge potential, and may be for instance a metallic material such as aluminum, an aluminum alloy, stainless steel or nickel plated steel, desirably aluminum or an aluminum alloy.

The shape of the positive electrode collector may be for instance that of a foil-shaped body or a porous body.

Particularly desirably, the positive electrode collector is an aluminum foil.

The positive electrode mixture can be given to the positive electrode collector in accordance with a known method. In the case for instance where the positive electrode collector is a foil-shaped body, the positive electrode mixture may be given through coating of one or both faces of the positive electrode collector with the positive electrode mixture, using a known coating apparatus (for instance a die coater, dip coater, comma coater or gravure coater). In the case for instance where the positive electrode collector is a porous body having voids in the interior thereof, the positive electrode mixture can be given by filling the positive electrode collector with the positive electrode mixture.

The drying step will be explained next.

In the drying step, the solvent is removed through drying of the positive electrode collector having had the positive electrode mixture given thereto, to form as a result a positive electrode mixture layer.

The drying step can be carried out in accordance with a known method using for instance known drying equipment. Drying conditions such as drying temperature and drying time may be decided as appropriate depending on the type and amount of the solvent that is used.

After the drying step, there may be carried out a step of pressing the positive electrode mixture layer, in order to adjust for instance the density of the positive electrode mixture layer. This step may be carried out in accordance with a known method.

The thermal treatment step will be explained next.

In the thermal treatment step, the positive electrode mixture layer formed in the drying step is thermally treated in an inert gas atmosphere or under reduced pressure. The thermal treatment is carried out so that oxygen-containing functional groups present on the surface of the activated detach from the surface of the activated carbon.

Examples of the inert gas atmosphere include for instance a nitrogen ($N_2$) atmosphere, and a rare gas atmosphere of argon (Ar) or the like.

In a case where the thermal treatment is performed under reduced pressure, the degree of reduced pressure may be set so that the amount of the oxygen and moisture in the atmosphere is lowered to an extent such that detachment of the oxygen-containing functional groups from the surface of the activated carbon is not hindered. The degree of reduced pressure may be for instance a degree achievable using a commercially available rotary pump.

The thermal treatment can be performed in accordance with a method such as infrared heating, resistance furnace heating or IH heating, and can be accomplished using a known heating apparatus. Specifically, for instance, the thermal treatment can be carried out by heating the positive electrode collector having the positive electrode mixture layer, inside a chamber provided with a heater and into which there is introduced an inert gas such as nitrogen. Alternatively, the thermal treatment may be carried out by heating the positive electrode collector having the positive electrode mixture layer, in vacuum, inside a vacuum chamber provided with a heater.

Heating may be carried out after the positive electrode collector provided with the positive electrode mixture layer has been disposed inside the heating device, or may be carried out by raising the temperature of the heating device, and thereafter arranging the positive electrode collector inside the heating device.

The conditions of the thermal treatment may be selected as appropriate so that the oxygen-containing functional groups present on the surface of the activated carbon detach from the surface of the activated carbon. The thermal treatment temperature is for instance 175° C. or higher, desirably 230° C. or higher. The thermal treatment temperature is desirably 320° C. or lower.

The thermal treatment time may be established as appropriate depending on the thermal treatment temperature, and may be for instance about several minutes. The thermal treatment time may be for instance 1 minute or longer, desirably 5 minutes or longer, and more desirably 7 minutes or longer. The thermal treatment time is desirably 1 hour or shorter, and more desirably 30 minutes or shorter.

The thermal treatment can be carried out easily using a thermal desorption spectrometer, in the case of a laboratory-scale test. The degree of reduced pressure and the thermal treatment conditions can be established easily through preliminary experimentation, using a thermal desorption spectrometer.

The carbon material has an end, i.e. an edge, of a carbon hexagonal mesh plane. The edge is terminated by hydrogen or various surface functional groups. The edge constitutes herein a reaction starting point, at which there are generated oxygen-containing functional groups such as carboxyl groups, phenolic hydroxyl groups, carbonyl groups, carboxylic acid anhydride groups, lactone groups or cyclic peroxide groups.

A porous carbon material such as an activated carbon has a large specific surface area, and accordingly the exposed proportion of the edge with respect to the bulk is very large. A large amount of the oxygen-containing functional groups such as those above is present as a result on the surface of the activated carbon; herein, the activated carbon surface becomes charged mainly as a result of dissociation of carboxyl groups and phenolic hydroxyl groups.

In Japanese Patent Application Publication No. 2015-154039 in the prior art, the activated carbon is heated in a reducing atmosphere to decrease the amount of carboxyl groups, with a view to improving cycle characteristics. However, Japanese Patent Application Publication No. 2015-154039 does not involve the technical idea of lowering the amount of oxygen-containing functional groups other than carboxyl groups. In Japanese Patent Application Publication No. 2015-154039, a positive electrode mixture paste is prepared using a thermally treated activated carbon as a starting material, to form a positive electrode mixture layer. In consequence, oxygen-containing functional groups become generated once again on the surface of the activated carbon as a result of contact with the solvent or binder during preparation of a paste.

In anticipation of the regeneration of the oxygen-containing functional groups at the time of formation of the positive electrode mixture layer, therefore, in the present embodiment, the activated carbon of the starting material is not thermally treated but the formed positive electrode mixture layer is thermally treated, in order to reduce the amount of the oxygen-containing functional groups on the surface of the activated carbon. In consequence, it becomes possible to produce a positive electrode in which there is reduced the amount of the oxygen-containing functional groups on the surface of the activated carbon contained in the positive electrode mixture layer. As the results of the examples described below reveal, a lithium ion capacitor of higher capacity can be obtained by producing the lithium ion capacitor using the positive electrode thus obtained.

In another aspect, therefore, the positive electrode for lithium ion capacitor according to the present embodiment is a positive electrode for lithium ion capacitor, provided with: a positive electrode mixture layer; wherein the positive electrode mixture layer contains at least an activated carbon and a binder; and the positive electrode mixture layer is thermally treated in an inert gas atmosphere or under reduced pressure, so that the oxygen-containing functional groups present on the surface of the activated carbon detach from the surface of the activated carbon.

With current technologies, it is difficult to completely identify the type of the oxygen-containing functional groups on the surface of the activated carbon, or to precisely quantify the oxygen-containing functional groups. As a result of diligent research, the inventors conceived of evaluating the surface state of the activated carbon having undergone the above thermal treatment, on the basis of the immersion potential of a cell that utilizes the positive electrode, and found that immersion potential changes as a result of the thermal treatment.

Specifically, it was found that upon construction of a single-electrode cell using the positive electrode, metallic lithium as a counter electrode, and using an electrolyte solution in the form of a solution resulting from dissolving $LiPF_6$ to a concentration of 1.0 mol/L in a mixed solvent that contains ethylene carbonate, dimethyl carbonate and ethyl methyl carbonate at a volume ratio of 1:1:1, the potential (i.e. immersion potential) at the inflection point of a dQ/dV-potential profile calculated on the basis of a CC-CV charge curve at a rate of 1/20 C is higher when a thermal treatment is carried out than when no thermal treatment is carried out. It was found that the potential at the inflection point can be brought to 3.05 V or higher, and further to 3.20 V or higher, depending on the conditions of the thermal treatment. It was found that the higher the potential at that inflection point, the further the capacity of the lithium ion capacitor can be increased.

In another aspect, therefore, the positive electrode for lithium ion capacitor according to the present embodiment is a positive electrode for lithium ion capacitor provided with a positive electrode mixture layer; wherein the positive electrode mixture layer contains at least an activated carbon and a binder; and when a single-electrode cell is constructed using metallic lithium as a counter electrode, and an using an electrolyte solution in the form of a solution resulting from dissolving $LiPF_6$ to a concentration of 1.0 mol/L in a mixed solvent that contains ethylene carbonate, dimethyl carbonate and ethyl methyl carbonate at a volume ratio of 1:1:1, the potential at an inflection point of a dQ/dV-potential profile calculated on the basis of a CC-CV charge curve at a rate of 1/20 C is 3.05 V (vs $Li^+/Li$) or higher.

The potential at the inflection point in the dQ/dV-potential profile is desirably 3.20 V (vs $Li^+/Li$) or higher. The potential at the inflection point can be increased by raising the thermal treatment temperature and prolonging the thermal treatment time in the thermal treatment step. The inflection point of the dQ/dV-potential profile can be determined by extrapolation. The measurement temperature of the potential at the inflection point of the dQ/dV-potential profile is for instance 25° C.±3° C.

Approaches for increasing the capacity of lithium ion capacitors include increasing volumetric energy density. Conceivable methods for increasing volumetric energy density include (a) increasing electrostatic capacity per unit weight of the activated carbon, and (b) raising an upper limit voltage $V_U$. Regarding method (a), the specific surface area of the activated carbon is already sufficiently large, and thus no significant improvement can be expected due to that limit in specific surface area. Regarding method (b), meanwhile, the contribution of voltage to energy is large, as expression $E=1/2\ CV^2$ indicates.

In the lithium ion capacitor, cation adsorption and desorption occur between a lower limit potential $V_L$ and an immersion potential $V_i$, as a boundary, while anion adsorption and desorption occur between the immersion potential $V_i$ and the upper limit potential $V_U$, the immersion potential $V_i$ being herein the potential upon immersion of the positive electrode using the activated carbon, in an electrolyte solution. Charge is accumulated and is released through such adsorption and desorption. In a case where the upper limit voltage $V_U$ is set to be high, a higher upper limit voltage $V_U$ translates into a lower salt concentration in the electrolyte solution, or into depletion, in the anion adsorption zone. Conceivable methods for preventing this include (A) a method of increasing the salt concentration in the electrolyte solution, (B) a method of increasing the amount of electrolyte solution, and (C) a method of raising the immersion potential $V_i$. Method (A) is disadvantageous in that the viscosity of the electrolyte solution increases with rising salt concentration, and results in turn in increased ion diffusion resistance. Method (B) is problematic in that the increase in the amount of electrolyte solution gives rise to a decrease in the volume fraction of the activated carbon in the lithium ion capacitor, which results in a drop in volumetric energy density. Therefore both method (A) and method (B) are unsuitable. Meanwhile, the method (C) of raising the immersion potential $V_i$ allows increasing effectively the volumetric energy density of the lithium ion capacitor, and increasing the capacity of the lithium ion capacitor.

Accordingly, the capacity of the lithium ion capacitor can be increased by virtue of the fact that the potential at the inflection point in the above-described dQ/dV-potential profile is 3.05 V or higher, as in the present embodiment. The capacity of the lithium ion capacitor can be further increased thanks to the fact that the potential at the inflection point is 3.20 V or higher.

In another aspect, the lithium ion capacitor according to the present embodiment is a lithium ion capacitor provided with the positive electrode for lithium ion capacitor of the above embodiment.

A configuration example of the above lithium ion capacitor will be explained next, with reference to FIG. 1 and FIG. 2.

Figure 1:
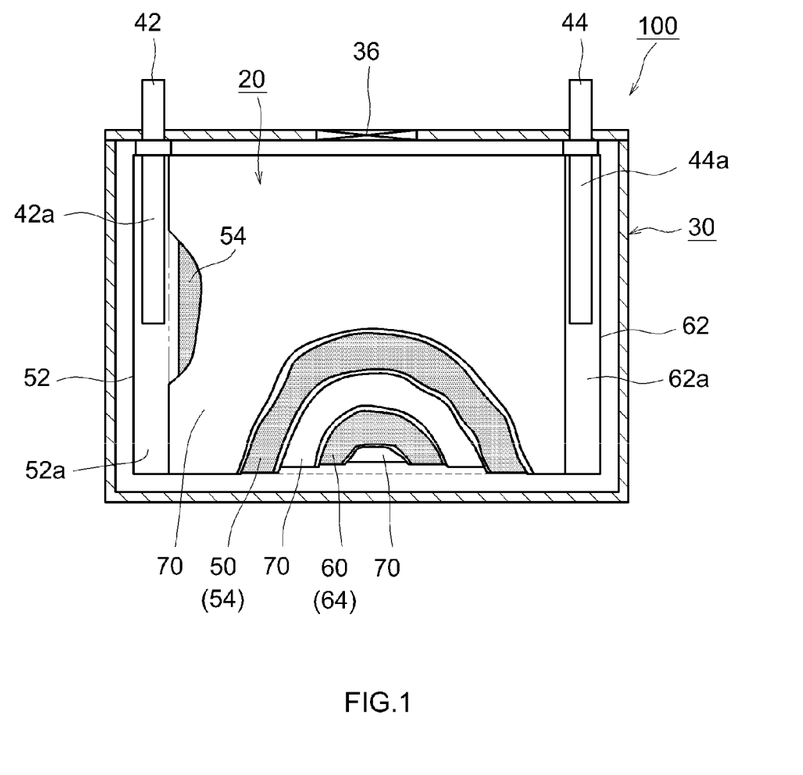
FIG. 1 is a cross-sectional diagram illustrating schematically the internal structure of a lithium ion capacitor according to an embodiment of the present teaching.

The lithium ion capacitor 100 illustrated in FIG. 1 has a configuration in which a flat-shaped wound electrode body 20 and an electrolyte solution (not shown) are accommodated in a flat square battery case 30. The battery case 30 is provided with a positive electrode terminal 42 and a negative electrode terminal 44 for external connection, and with a thin-walled safety valve 36 configured to relieve internal pressure in the battery case 30 when the internal pressure rises to a predetermined level or above. An inlet (not shown) for injection of an electrolyte solution is provided also in the battery case 30. The positive electrode terminal 42 is electrically connected to a positive electrode collector plate 42a. The negative electrode terminal 44 is electrically connected to a negative electrode collector plate 44a. For instance, a lightweight metallic material of good thermal conductivity, such us aluminum, is used as the material of the battery case 30.

Figure 2:
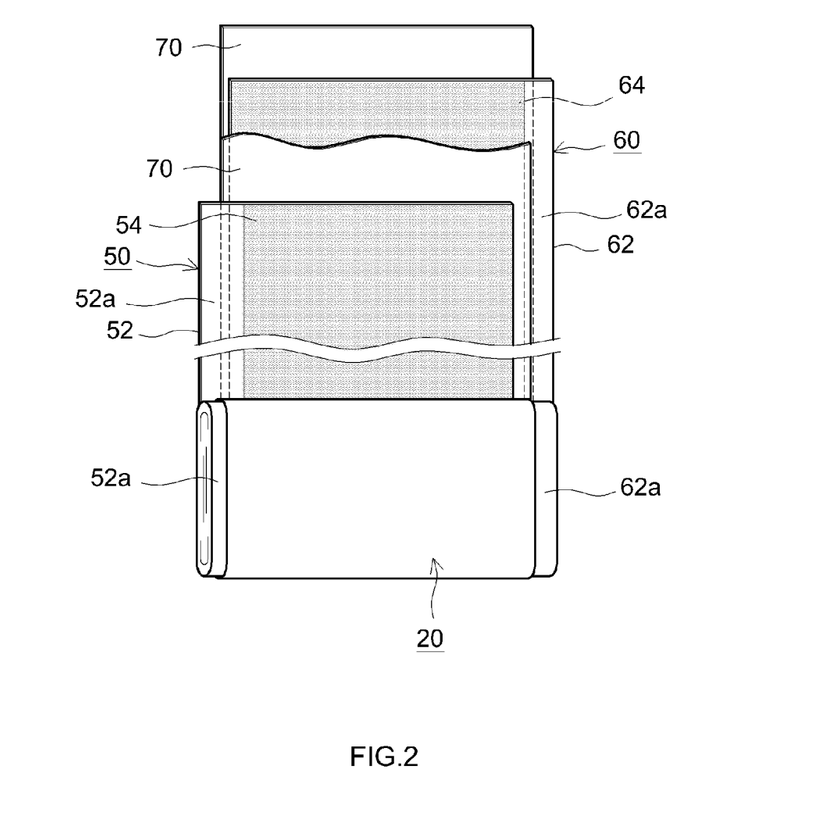
FIG. 2 is a schematic diagram illustrating the configuration of a wound electrode body of a lithium ion capacitor according to an embodiment of the present teaching.

As illustrated in FIG. 1 and FIG. 2, the wound electrode body 20 is of a form obtained by laminating a sheet-shaped positive electrode 50 in which a positive electrode mixture layer 54 is formed along the longitudinal direction on one or both faces (herein both faces) of an elongated positive electrode collector 52, and a sheet-shaped negative electrode 60 in which a negative electrode mixture layer 64 is formed along the longitudinal direction on one face or both faces (herein both faces) of an elongated negative electrode collector 62, with two elongated separator sheets 70 interposed in between, and by winding then the resulting laminate in the longitudinal direction. The positive electrode collector plate 42a and the negative electrode collector plate 44a are respectively joined to a positive electrode mixture layer non-formation section 52a (i.e. exposed portion of the positive electrode collector 52 at which the positive electrode mixture layer 54 is not formed) and a negative electrode mixture layer non-formation section 62a (i.e. exposed portion of the negative electrode collector 62 at which the negative electrode mixture layer 64 is not formed) that are formed so as to protrude outward from both edges of the wound electrode body 20 in the winding axis direction thereof (sheet width direction perpendicular to the longitudinal direction).

The positive electrode for lithium ion capacitor according to the present embodiment is used in the positive electrode 50.

Examples of the material of the negative electrode collector 62 that makes up the negative electrode 60 include for instance metallic materials such as copper, copper alloys, nickel, nickel alloys, stainless steel and nickel-plated steel, desirably copper. Accordingly, a copper foil is desirably used as the negative electrode collector 62.

The negative electrode mixture layer 64 contains a negative electrode active material. A known negative electrode active material used in negative electrodes for lithium ion capacitors can be used herein as the negative electrode active material. Examples of the negative electrode active material include carbon materials capable of storing and releasing lithium, for instance graphite, hard carbon and soft carbon. For instance, lithium titanium oxide or silicon oxide can be used as the negative electrode active material.

The negative electrode mixture layer may contain components other than the negative electrode active material, for instance a conductive material, a binder and a thickener.

Examples of the conductive material include carbon black such as acetylene black and Ketjen black.

Examples of the binder include styrene butadiene rubber (SBR).

Examples of the thickener include carboxymethyl cellulose (CMC).

In the present embodiment, an electrode provided with the negative electrode mixture layer 64 on the negative electrode collector 62 is used as the negative electrode 60, but the form of the negative electrode 60 is not limited thereto. For instance, a porous body may be used as the negative electrode collector 62, such that the negative electrode 60 takes on a form where the negative electrode mixture layer 64 is held inside the pores of the porous negative electrode collector 62. A lithium metal electrode or the like may be used as the negative electrode 60.

A known separator that is utilized in lithium ion capacitors may be used as the separators 70.

For example, a porous sheet made of a resin such as polyethylene (PE), polypropylene (PP), polyester, cellulose or polyamide can be used as the separators 70. The porous sheet may have a single-layer structure or may have a multilayer structure of two or more layers (for instance a three-layer structure in which a PP layer is laid up on both faces of a PE layer). The thickness of the separators 70 is not particularly limited, and may be for instance 10 μm to 100 μm. The average pore size of the separators 70 is not particularly limited, and may be for instance 0.01 μm to 5 μm.

A known electrolyte solution that is utilized in lithium ion capacitors may be used herein as the electrolyte solution. The electrolyte solution typically contains an electrolyte salt and a nonaqueous solvent. The electrolyte solution may contain additives and the like, as needed.

The electrolyte salt is desirably a lithium salt. Concrete examples thereof include $LiPF_6$, $LiBF_4$, $LiClO_4$, $LiAsF_6$, $Li(C_2F_5SO_2)_2$ and $LiN(CF_3SO_2)_2$. Desirably among the foregoing, the electrolyte salt contains not less than 80 mass % but not more than 100 mass % of $LiPF_6$ with respect to the total mass of the electrolyte salt, and more desirably the electrolyte salt is $LiPF_6$ (i.e. 100 mass % of $LiPF_6$), given the high ion conductivity and low resistance of $LiPF_6$.

Examples of the nonaqueous solvent include cyclic carbonates such as ethylene carbonate (EC), propylene carbonate (PC) and butylene carbonate, as well as linear carbonates such as dimethyl carbonate (DMC), methyl ethyl carbonate (MEC), diethyl carbonate (DEC), methyl propyl carbonate (MPC) and methyl butyl carbonate (MBC). As the nonaqueous solvent, cyclic esters such as γ-butyrolactone, cyclic sulfones such as sulfolane, cyclic ethers such as dioxolane, linear carboxylic acid esters such as ethyl propionate, and linear ethers such as dimethoxyethane also may be used. The foregoing can be used singly or in combinations to two or more types. In particular, a mixed solvent that contains a cyclic carbonate and a linear carbonate is desirably used herein, since in that case an electrolyte solution is obtained that has low viscosity, high degree of dissociation, and high ionic conductivity.

The concentration of the lithium salt in the electrolyte solution is desirably 0.1 mol/L or higher, and more desirably not lower than 0.5 mol/L but not higher than 1.5 mol/L.

A square-type lithium ion capacitor 100 provided with a flat wound electrode body 20 has been explained above as an example. However, the configuration of the lithium ion capacitor according to the present embodiment is not limited thereto, and for instance the lithium ion capacitor according to the present embodiment can be configured in the form of a lithium ion capacitor provided with a stacked-type electrode body. For instance, the lithium ion capacitor according to the present embodiment can be configured in the form of a cylindrical lithium ion capacitor, a laminate type lithium ion capacitor or the like.

The lithium ion capacitor 100 configured as described above can be used in various applications in which an electric storage device is utilized. Suitable applications include drive power sources mounted on vehicles such as electric vehicles (EVs), hybrid vehicles (HVs) and plug-in hybrid vehicles (PHVs).

In another aspect, the method for producing a lithium ion capacitor according to the present embodiment includes: a step (hereafter referred to as "positive electrode production step") of obtaining a positive electrode for lithium ion capacitor in accordance with the method for producing a positive electrode for lithium ion capacitor of the above embodiment; a step (hereafter referred to as "electrode body production step") of producing an electrode body in a dry atmosphere, by using a negative electrode, a separator and the obtained positive electrode for lithium ion capacitor; a step (hereafter referred to as "lithium ion capacitor production step") of producing a lithium ion capacitor in a dry atmosphere, using an electrolyte solution and the produced electrode body. The positive electrode for lithium ion capacitor obtained in the positive electrode production step is placed in a dry atmosphere.

The method for producing a lithium ion capacitor according to the present embodiment will be explained in detail, taking as an example the lithium ion capacitor 100 illustrated in FIG. 1.

The positive electrode production step can be implemented by performing the production method in the above-described embodiment. The positive electrode 50 obtained herein is placed in a dry atmosphere. Specifically, the thermal treatment step of the method for producing a positive electrode for lithium ion capacitor of the present embodiment is carried out, and thereafter the positive electrode 50 is transferred to a dry atmosphere.

Through transfer of the positive electrode 50 to a dry atmosphere, there is prevented regeneration of the oxygen-containing functional groups on the surface of the activated carbon in the positive electrode mixture layer 54.

In the present specification, the term dry atmosphere denotes an atmosphere the moisture content of which is lower than that of the ambient air atmosphere. Desirably, the dew point temperature of the dry atmosphere is −20° C. or lower, more desirably −40° C. or lower, and yet more desirably −50° C. or lower. Examples of the dry atmosphere include a dry air atmosphere, an inert gas atmosphere of a rare gas such as argon or of nitrogen gas, and a reduced pressure state such as vacuum.

An electrode body production step will be explained next.

The negative electrode 60 and the separators 70 can be produced and prepared according to a known method.

The electrode body production step can be performed in a dry atmosphere, in accordance with a known method. Specifically, in the case for instance where the wound electrode body 20 illustrated in the figures is to be produced, the positive electrode 50 and the negative electrode 60 are laid up on each other across interposed separators 70, to thereby produce a stack that is then wound to yield the wound electrode body 20.

In the case of a stacked-type electrode body, the electrode body can be produced by laying up a plurality of positive electrodes and a plurality of negative electrodes on each other, across separators interposed therebetween.

The lithium ion capacitor production step will be explained next.

The lithium ion capacitor production step can be performed in a dry atmosphere, in accordance with a known method.

In the example of the figures, there is prepared a battery case 30 made up of a case body having an opening, and a lid body that plugs the opening. A safety valve 36 and an inlet are provided in the lid body of the battery case 30.

Next, the positive electrode terminal 42 and the positive electrode collector plate 42a, and the negative electrode terminal 44 and the negative electrode collector plate 44a, are attached to the lid body of the battery case 30. The positive electrode collector plate 42a and the negative electrode collector plate 44a are respectively welded to the positive electrode collector 52 and the negative electrode collector 62 that are exposed at the edges of the wound electrode body 20 (i.e. are welded to the positive electrode mixture layer non-formation section 52a and the negative electrode mixture layer non-formation section 62a, respectively). The wound electrode body 20 is accommodated into the body of the battery case 30 through the opening thereof, and the body of the battery case 30 and the lid body are welded together.

The electrolyte solution is injected next through the inlet, and the inlet is sealed.

The lithium ion capacitor 100 can be thus produced as described above.

In the production method according to the present embodiment, the produced positive electrode is transferred to a dry atmosphere, and the electrode body production step and the lithium ion capacitor production step are carried out in a dry atmosphere; as a result, there is prevented regeneration of the oxygen-containing functional groups on the surface of the activated carbon in the positive electrode mixture layer 54 of the positive electrode 50 contained in the lithium ion capacitor 100. The capacity of the lithium ion capacitor 100 is increased thereby.

The production method according to the present embodiment may be carried out in one same dry atmosphere, or may be carried out by changing over halfway to a different dry atmosphere.

Examples of the present teaching will be explained next, but the teaching is not meant to be limited to such examples.

Example 1

An activated carbon, a binder and a conductive aid were mixed in N-methyl pyrrolidone (NMP) at a mass ratio of 90:5:5, to obtain a positive electrode mixture paste. The solids concentration of the positive electrode mixture paste was herein set to 30 mass %.

The obtained positive electrode mixture paste was applied to both faces of an aluminum foil with 15 µm thick. The coating amount per side was set to 6 mg/cm$^2$. The whole was dried to thereby form a positive electrode mixture layer. The positive electrode mixture layer was next pressed, to adjust the density of the positive electrode mixture layer to 0.7±0.1 g/cm$^3$.

The resultant was then placed under reduced pressure by being set in a thermal desorption spectrometer, and evacuating the interior of the device down to $1\times10^{-7}$ Pa. Thereafter the interior of the device was heated up to 320° C. at a temperature rise rate of 64° C./minute. After reaching 320° C., that temperature was held for 10 minutes. From the desorbed gas that was then generated, it could be confirmed that oxygen-containing functional groups detached from the surface of the activated carbon.

A positive electrode was thus obtained. The positive electrode was then transferred from the thermal desorption spectrometer to a dry atmosphere.

There were prepared a lithium foil as a negative electrode and a polyolefin porous film with 15 µm thick as a separator. The obtained positive electrode, negative electrode and separator were laid up on each other in a dry atmosphere, to yield an electrode body having the layer structure: separator/positive electrode/separator/lithium foil.

Terminals were attached to the electrode body in an inert gas atmosphere, and the whole was accommodated in a laminate case. An electrolyte solution was injected into the laminate case, to impregnate the electrode body with the electrolyte solution. The electrolyte solution used herein resulted from dissolving LiPF$_6$, to a concentration of 1.0 mol/L, in a mixed solvent that contained ethylene carbonate (EC), dimethyl carbonate (DMC) and ethyl methyl carbonate (EMC) at a volume ratio of 1:1:1.

A lithium ion capacitor was thus obtained.

Examples 2 to 10

Positive electrodes were obtained in the same manner as in Example 1, except that herein the highest reached temperature in the thermal desorption spectrometer was set to the temperatures given in Table 1, and the holding time at the highest reached temperature was set to the times given in Table 1. Lithium ion capacitors were obtained in the same manner as in Example 1 using herein these positive electrodes.

Examples 11 to 20

Positive electrodes were obtained in the same manner as in Example 1, except that herein the interior of the thermal desorption spectrometer was filled with nitrogen gas, the highest reached temperature in the thermal desorption spectrometer was set to the temperatures given in Table 1, and the holding time at the highest reached temperature was set to the times given in Table 1. Lithium ion capacitors were obtained in the same manner as in Example 1 using herein these positive electrodes.

Examples 21 to 30

Positive electrodes were obtained in the same manner as in Example 1, except that herein the interior of the thermal desorption spectrometer was filled with argon gas, the highest reached temperature in the thermal desorption spectrometer was set to the temperatures given in Table 1, and the holding time at the highest reached temperature was set to the times given in Table 1. Lithium ion capacitors were obtained in the same manner as in Example 1 using herein these positive electrodes.

Comparative Example 1

An activated carbon, a binder and a conductive aid were mixed in N-methyl pyrrolidone (NMP) at a mass ratio of 90:5:5, to obtain a positive electrode mixture paste. The solids concentration of the positive electrode mixture paste was herein set to 30 mass %.

The obtained positive electrode mixture paste was applied to both faces of an aluminum foil with 15 μm thick. The coating amount per side was set to 6 mg/cm². The whole was dried to thereby form a positive electrode mixture layer. Next the positive electrode mixture layer was pressed, to adjust the density of positive electrode mixture layer to 0.7±0.1 g/cm³.

A positive electrode was thus obtained. In the positive electrode of Comparative example 1, the positive electrode mixture layer was not subjected to a thermal treatment.

A lithium ion capacitor was obtained in the same manner as in Example 1 using herein this positive electrode.

Comparative Example 2

An activated carbon was placed under reduced pressure by being set in a thermal desorption spectrometer and evacuating the interior of the device down to $1 \times 10^{-7}$ Pa. Thereafter the interior of the device was heated up to 320° C. at a rate of temperature rise of 64° C./minute. After reaching 320° C., that temperature was held at 320° C. for 10 minutes.

The activated carbon thus thermally treated, a binder and a conductive aid were mixed in N-methyl pyrrolidone (NMP) at a mass ratio of 90:5:5 to obtain a positive electrode mixture paste. The solids concentration of the positive electrode mixture paste was herein set to 30 mass %.

The obtained positive electrode mixture paste was applied to both faces of an aluminum foil with 15 μm thick. The coating amount per side was set to 6 mg/cm². The whole was dried to thereby form a positive electrode mixture layer. Next the positive electrode mixture layer was pressed, to adjust the density of positive electrode mixture layer to 0.7±0.1 g/cm³.

A positive electrode was thus obtained. Accordingly, the activated carbon in the positive electrode in Comparative example 2 was thermally treated, but the positive electrode mixture layer was not subjected to a thermal treatment.

A lithium ion capacitor was obtained in the same manner as in Example 1 using herein this positive electrode.

Measurement of Immersion Potential

Figure 3:
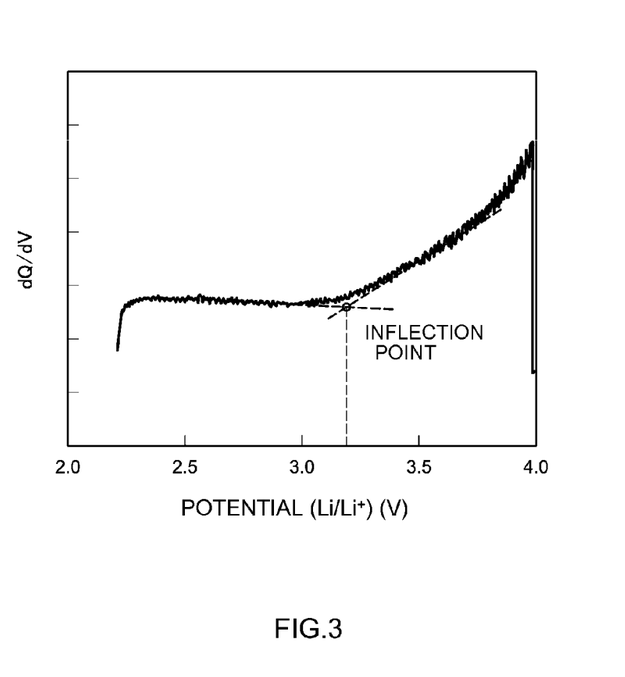
FIG. 3 is a measured dQ/dV-potential profile of Example 1.

The immersion potential of the lithium ion capacitors of each of Examples and Comparative Examples was measured. Specifically, each lithium ion capacitor was charged by constant current-constant voltage (CC-CV) at a rate of 1/20 C, in a temperature environment of 25° C.±3° C. An inflection point in a dQ/dV-potential profile calculated on the basis of a respective obtained charge curve was determined through extrapolation. The potential at this inflection point is the immersion potential. Results are given in Table 1. For reference, the measured dQ/dV-potential profile of Example 1 is illustrated in FIG. 3.

Evaluation of Resistance

Several cycles of charge and discharge, including the first charging, were performed on the lithium ion capacitors of each of Examples and Comparative Examples. Resistances $R_{4.1V}$ and $R_{3.0V}$ were determined on the basis of a voltage drop $\Delta V_{4.1V}$ at a time of three-second discharge at 4.1 V, and on the basis of a voltage drop $\Delta V_{3.0V}$ at a time of three-second charging at 3.0 V, respectively. A ratio $R_{4.1V}/R_{3.0V}$ was determined as a percentage, and was taken as an index of resistance change. In a case where the drop in salt concentration at 4.1 V is significant, the increase in resistance at 4.1 V is greater than that at 3.0 V. Therefore, the fact the ratio $R_{4.1V}/R_{3.0V}$ is low means that the capacity of the lithium ion capacitor can be increased. Results are given in Table 1.

TABLE 1

| | Thermal treatment conditions | | | | | |
|---|---|---|---|---|---|---|
| | Atmosphere | Reached temperature | Temperature rise rate | Holding time | Immersion potential | $R_{4.1V}/R_{3.0V}$ |
| Comparative example. 1 | | Without thermal treatment | | | 2.980 V | 168% |
| Comparative example. 2 | | Activated carbon thermally treated | | | 2.981 V | 165% |
| Example 1 | Vacuum | 320° C. | 64° C./min | 10 min | 3.250 V | 105% |
| Example 2 | Vacuum | 290° C. | 64° C./min | 10 min | 3.245 V | 106% |
| Example 3 | Vacuum | 260° C. | 64° C./min | 10 min | 3.220 V | 108% |
| Example 4 | Vacuum | 230° C. | 64° C./min | 10 min | 3.195 V | 110% |
| Example 5 | Vacuum | 210° C. | 64° C./min | 10 min | 3.073 V | 116% |
| Example 6 | Vacuum | 175° C. | 64° C./min | 10 min | 3.051 V | 117% |
| Example 7 | Vacuum | 320° C. | 64° C./min | 7 min | 3.251 V | 104% |
| Example 8 | Vacuum | 320° C. | 64° C./min | 3 min | 3.248 V | 106% |
| Example 9 | Vacuum | 320° C. | 64° C./min | 1 min | 3.126 V | 109% |
| Example 10 | Vacuum | 320° C. | 64° C./min | 0 min | 3.076 V | 114% |
| Example 11 | $N_2$ | 320° C. | 64° C./min | 10 min | 3.185 V | 103% |

TABLE 1-continued

| | Thermal treatment conditions | | | | | |
|---|---|---|---|---|---|---|
| | Atmosphere | Reached temperature | Temperature rise rate | Holding time | Immersion potential | $R_{4.1V}/R_{3.0V}$ |
| Example 12 | $N_2$ | 290° C. | 64° C./min | 10 min | 3.180 V | 104% |
| Example 13 | $N_2$ | 260° C. | 64° C./min | 10 min | 3.156 V | 106% |
| Example 14 | $N_2$ | 230° C. | 64° C./min | 10 min | 3.131 V | 108% |
| Example 15 | $N_2$ | 210° C. | 64° C./min | 10 min | 3.012 V | 114% |
| Example 16 | $N_2$ | 175° C. | 64° C./min | 10 min | 2.990 V | 115% |
| Example 17 | $N_2$ | 320° C. | 64° C./min | 7 min | 3.186 V | 102% |
| Example 18 | $N_2$ | 320° C. | 64° C./min | 3 min | 3.183 V | 104% |
| Example 19 | $N_2$ | 320° C. | 64° C./min | 1 min | 3.063 V | 107% |
| Example 20 | $N_2$ | 320° C. | 64° C./min | 0 min | 3.014 V | 112% |
| Example 21 | Ar | 320° C. | 64° C./min | 10 min | 3.218 V | 101% |
| Example 22 | Ar | 290° C. | 64° C./min | 10 min | 3.213 V | 102% |
| Example 23 | Ar | 260° C. | 64° C./min | 10 min | 3.188 V | 104% |
| Example 24 | Ar | 230° C. | 64° C./min | 10 min | 3.163 V | 106% |
| Example 25 | Ar | 210° C. | 64° C./min | 10 min | 3.042 V | 111% |
| Example 26 | Ar | 175° C. | 64° C./min | 10 min | 3.020 V | 112% |
| Example 27 | Ar | 320° C. | 64° C./min | 7 min | 3.218 V | 100% |
| Example 28 | Ar | 320° C. | 64° C./min | 3 min | 3.216 V | 102% |
| Example 29 | Ar | 320° C. | 64° C./min | 1 min | 3.095 V | 105% |
| Example 30 | Ar | 320° C. | 64° C./min | 0 min | 3.045 V | 109% |

As shown in Table 1, Comparative example 1 where the positive electrode mixture layer was not thermally treated in an inert gas atmosphere or under reduced pressure, exhibit a value of 2.980 V of immersion potential for a case where a single-electrode cell was constructed using metallic lithium as a counter electrode and using an electrolyte solution in the form of a solution resulting from dissolving $LiPF_6$, to a concentration of 1.0 mol/L, in a mixed solvent containing ethylene carbonate, dimethyl carbonate and ethyl methyl carbonate at a volume ratio of 1:1:1.

It is found that the ratio $R_{4.1V}/R_{3.0V}$ was high and salt concentration dropped significantly.

By contrast, Table 1 reveals that in Examples in which the positive electrode mixture layer was thermally treated in an inert gas atmosphere or under reduced pressure, the immersion potentials were higher than that in Comparative example 1. It is found that when lithium ion capacitors in which the positive electrodes of Examples were utilized, the ratio $R_{4.1V}/R_{3.0V}$ is low, and the problem of extreme drop in salt concentration at high voltage is resolved. Therefore, by using the positive electrodes of Examples, it becomes possible to utilize a lithium ion capacitor up to a high potential, while suppressing increases in resistance. As a result of this, the capacity of the lithium ion capacitor can be increased.

In Comparative example 2, where the activated carbon of the starting material was thermally treated, the immersion potential and the ratio $R_{4.1V}/R_{3.0V}$ were comparable to those of Comparative example 1. A conceivable underlying reason for this is that even if the amount of the oxygen-containing functional groups on the surface of the activated carbon of the starting material are reduced through a thermal treatment, regeneration of the oxygen-containing functional groups on the surface of the activated carbon occurs by contacting the activated carbon with the solvent and the binder during production of the positive electrode mixture paste.

From the above, it can be understood that the positive electrode for lithium ion capacitor disclosed herein allows increasing the capacity of a lithium ion capacitor.

Concrete examples of the present teaching have been explained above in detail, but the concrete examples are illustrative in nature, and are not meant to limit the scope of the claims in any way. The art set forth in the claims include various alterations and modifications of the concrete examples illustrated above.

What is claimed is:

1. A method for producing a positive electrode for lithium ion capacitor, the method comprising the steps of: giving a positive electrode mixture containing an activated carbon, a binder and a solvent, to a positive electrode collector;
    drying the positive electrode collector having the positive electrode mixture given thereto, to form a positive electrode mixture layer; and
    thermally treating the formed positive electrode mixture layer in an inert gas atmosphere or under reduced pressure at a temperature of 175° C. to 290° C. for a time period of 1 minute to 30 minutes, so that oxygen-containing functional groups present on the surface of the activated carbon detach from the surface of the activated carbon.

2. A method for producing a lithium ion capacitor, the method comprising the steps of:
    obtaining a positive electrode for lithium ion capacitor in accordance with the method for producing a positive electrode for lithium ion capacitor according to claim 1;
    producing an electrode body in a dry atmosphere, using a negative electrode, a separator and the obtained positive electrode for lithium ion capacitor; and
    producing a lithium ion capacitor in a dry atmosphere, using an electrolyte solution and the produced electrode body,
    wherein in the step of obtaining the positive electrode for lithium ion capacitor, the obtained positive electrode for lithium ion capacitor is placed in a dry atmosphere.

3. A positive electrode for lithium ion capacitor, comprising a positive electrode mixture layer,
    wherein the positive electrode mixture layer contains at least an activated carbon and a binder; and
    the positive electrode mixture layer is thermally treated in an inert gas atmosphere or under reduced pressure at a temperature of 175° C. to 290° C. for a time period of 1 minute to 30 minutes, so that oxygen-containing functional groups present on the surface of the activated carbon detach from the surface of the activated carbon.

4. A positive electrode for lithium ion capacitor, comprising a positive electrode mixture layer,
wherein the positive electrode mixture layer contains at least an activated carbon and a binder; and
when a single-electrode cell is constructed using metallic lithium as a counter electrode, and an using an electrolyte solution in the form of a solution resulting from dissolving LiPF6 to a concentration of 1.0 mol/L in a mixed solvent that contains ethylene carbonate, dimethyl carbonate and ethyl methyl carbonate at a volume ratio of 1:1:1, the potential at an inflection point of a dQ/dV-potential profile calculated on the basis of a CC-CV charge curve at a rate of 1/20 C is 3.05 V or higher.

5. The positive electrode for lithium ion capacitor according to claim 4, wherein the potential at the inflection point is 3.20 V or higher.

6. A lithium ion capacitor, comprising the positive electrode for lithium ion capacitor according to claim 3.

7. A lithium ion capacitor, comprising the positive electrode for lithium ion capacitor according to claim 4.

* * * * *